United States Patent Office 3,085,893
Patented Apr. 16, 1963

3,085,893
BARIUM ZIRCONIUM BORATE, PIGMENTS CONTAINING THE SAME, AND PROCESSES FOR THEIR PRODUCTION
Stanley J. Buckman, Raleigh, John D. Pera, Memphis, and Glen R. Funderburk, Craigmont, Tenn., assignors to Buckman Laboratories, Inc., Memphis, Tenn., a corporation of Tennessee
No Drawing. Filed Mar. 6, 1961, Ser. No. 93,325
5 Claims. (Cl. 106—299)

The present invention relates to a new compound, barium zirconium borate, and pigments containing or consisting predominantly of barium zirconium borate, which pigments are characterized by greater resistance to leaching by water, and a higher refractive index than heretofore known barium borate pigments, such as barium metaborate and silica-coated barium metaborate pigments, and processes of producing such pigments.

Barium borates, particularly barium metaborate, when added as pigments to paint vehicles, produce paints whose films are characterized by increased resistance to deterioration or disfiguration by the growth and proliferation of microorganisms and to associated dirt collection. Oil paints containing titanium dioxide or other pigments, whose films are normally susceptible to chalking, that is, the evolution of loose removable powder at or just beneath the surface of the film, become more resistant to such chalking when a barium borate pigment is included in the paint. Such uses of barium borates, including barium borosilicate, and advantages of paints containing such pigments are more fully described in U.S. Patent No. 2,818,344.

When used in water-emulsion paints, barium borates have a tendency to form larger crystalline hydrated particles and are more soluble in the aqueous phases of such emulsion paints than in drying oils or other organic vehicles or solvents. By coating barium metaborate particles with hydrated amorphous silica, as described in United States patent application Serial No. 859,104, filed December 14, 1959, pigment particles can be obtained which are less leachable by water than are barium metaborate particles. Such silica-coated barium metaborate pigments retain to a substantial degree the desirable fungitoxic effectiveness of uncoated barium metaborate pigments in paint films. The solubility of barium metaborate in water at 20° C. is approximately 0.7 gram per 100 milliliters, while the total quantity of solids which is extractable or leachable from silica-coated barium metaborate pigments by water to form a saturated solution is not more than 0.3 gram per 100 milliliters of water. When the pure barium zirconium borate of the present invention is leached with water, dissolved substances, assayed as barium oxide (BaO) and boron trioxide ($B_2O_3$), in amounts of the order of 0.003 gram per 100 milliliters are found in the extracts. The term "leaching" is used herein in its restricted sense to refer only to the removal of components of a mixture or of a compound by percolation or extraction processes.

The principal object of the present invention is to provide a white solid composition of matter which, when embodied as a pigment in a dried paint film, will release barium and borate ions at a slower rate than uncoated or silica-coated barium metaborate, and that is also consequently less susceptible to leaching from paint films by rain or water. An ultimate object of the present invention is to provide a paint that will deposit films that are resistant for longer periods to disfiguration by mold growth and associated dirt collection than are films deposited from paints preserved with uncoated or silica-coated barium metaborate pigments. Another object of the present invention is to provide a pigment having the desirable characteristics of barium borates which, however, is more suitable for use in aqueous emulsion paints and in aqueous compositions for the coating of paper, textiles, and similar materials. Other objects and advantages of the present invention, some of which are referred to hereinafter, will be apparent to those skilled in the art to which it pertains.

The present invention is based upon the discovery that barium metaborate forms a crystalline compound with zirconium dioxide that is much less readily leached by water than barium metaborate, barium borosilicate, or silica-coated barium metaborate, yet is not as insoluble and inert as barium sulfate. Pigments consisting of or containing this compound can be used in paints and aqueous coating compositions as preservatives and for other purposes for which more-soluble barium borates were heretofore less suited.

This crystalline compound, which is designated herein as barium zirconium borate, may be represented by the empirical Berzelian formula $BaO \cdot ZrO_2 \cdot B_2O_3$, which corresponds to a stoichiometric composition of 44.30 percent barium oxide (BaO), 35.59 percent zirconium dioxide ($ZrO_2$) and 20.11 percent boron trioxide ($B_2O_3$). During leaching the compound appears to hydrolyze slowly to release barium and borate ions, leaving zirconium dioxide or other zirconium compounds as an insoluble residue. The total amount of barium and boron constituents (assayed as barium oxide and boron trioxide) that are leachable from this compound by water at 25° C. is of the order of 0.003 gram per 100 milliliters, which is only slightly more than the solubility of barium carbonate in water at that temperature.

Barium zirconium borate melts at a temperature in excess of 1250° C. and its index of refraction is approximately 1.77, which is greater than that of barium metaborate (1.54 to 1.56), determined microscopically by means of liquids of determinate refractive index (Becke test). Its density is approximately 5.44 grams per cubic centimeter.

Barium zirconium borate and pigments composed of mixtures of barium zirconium borate with barium metaborate or zirconium dioxide can be prepared conveniently and directly by heating at temperatures in excess of approximately 800° C. mixtures of zirconium dioxide and barium metaborate, or mixtures of zirconium dioxide and reactants which produce barium metaborate, such as barium hydroxide, barium sulfide, and barium carbonate as sources of barium oxide; and boric acid as a source of boron trioxide.

They can also be made by heating mixtures of barium metazirconate ($BaO \cdot ZrO_2$) and boron trioxide or substances which produce boron trioxide, such as boric acid.

The characteristics of the products produced in accordance with the processes of this invention depend upon the stoichiometric proportions of the reactants that are used, the temperature of the heating, and the length of the heating period. Generally temperatures within the range between 800° and 1300° C. and periods of heating between approximately 10 minutes and approximately 24 hours are adequate. Since the characteristics of the products remain essentially unchanged when heated for periods longer than are required to produce the desired barium zirconium borate at the particular temperature, reference to a maximum period of 24 hours should be regarded as a matter of operational convenience rather than a significant restriction. The characteristics of the products also depend upon the purities of the original reactants and any subsequent purification processes to which the products may be subjected.

In preparing the barium zirconium borate and other products of the present invention, the proportions of the reactants are controlled in such manner as to obtain products that consist essentially of barium zirconium borate or that contain preselected proportions of barium metaborate or other barium borate together with barium zirconium borate, as illustrated in Example 4 hereinafter.

Although it is possible to prepare compositions having proportions of zirconium dioxide greater than that stoichiometrically required to form the specified barium zirconium borate (35.59 percent), as illustrated in Example 5 hereinafter, the excess zirconium dioxide in such compositions appears to remain uncombined and does not affect the leachability of the resulting product, which is essentially the same as that of barium zirconium borate. However, such products which contain smaller proportions of leachable compounds of barium and boron would consequently become exhausted sooner in a paint film than barium zirconium borate.

It is also possible to prepare compositions whose contents of barium oxide and boron trioxide do not conform to the equimolecular ratio represented by barium metaborate. Although such compositions would be expected to contain barium zirconium borate, the nature of the other constituents, and their leachability, is not as readily controllable as is the leachability of products described in the examples hereinafter.

The products of this invention are consequently to be regarded essentially as the compound designated herein as barium zirconium borate, and mixtures of that compound with barium borates and zirconium oxides. Such products may contain small or significant proportions of unreacted starting materials, including barium borates other than barium metaborate and zirconium oxides, together with impurities or traces of impurities present in or attributable to the particular starting chemical compounds or substances that were used in their production. Impurities may affect the color and the leachability of barium and borate ions from barium zirconium borate more than they are likely to affect its other physical and chemical characteristics.

Zirconium dioxide ($ZrO_2$, which is also known as zirconia) prepared by decomposition of zirconium sulfate tetrahydrate, or prepared by precipitation in hydrous form by hydrolysis of zirconium sulfate tetrahydrate or zirconium tetrachloride, or by neutralization of such zirconium compounds with aqueous solutions of bases, as described hereinafter, as well as the zirconia-containing mineral, baddeleyite, may be used as sources of zirconium dioxide. Instead of using zirconium dioxide as a starting material, zirconium sulfate tetrahydrate, which decomposes to zirconium dioxide at temperatures attained during the heating, may be used as illustrated in Example 2 hereinafter.

Barium sulfide may be used instead of barium carbonate or barium hydroxide as a source of barium. It may be fused directly with boric acid and zirconium dioxide to produce barium zirconium borate and other products of this invention. Hydrogen sulfide and sulfur dioxide are expelled during the heating of such mixtures.

When the mass of commingled particles of barium metaborate or its equivalent and zirconium dioxide or its equivalent are heated, any water or other volatile substances will gradually be expelled and, as the temperature rises, the particles will sinter, beginning at approximately 800° C., to become a coherent solid mass without thoroughly fusing or melting together. The term "sintering" is used herein to distinguish from melting by fusion and from calcination, which latter is generally understood in its restricted sense to refer to a process of heating in which larger particles become friable and are reduced to particles of smaller size. In preparing the compound and products of the present invention, it is not necessary to heat to fusion or produce a clear melt, since adequate reaction can be effected at lower sintering temperatures in accordance with procedures normally adopted in the production of ceramics and referred to as "solid-state" reaction conditions, namely, sintering at temperatures below the melting point, thereafter pulverizing the sintered mass and thoroughly mixing together the pulverized particles, reheating, and repeating these steps until a homogenous product is obtained.

Barium metaborate and zirconium dioxide mixtures which have been sintered in this manner contain substantial proportions or may be entirely composed of the barium zirconium borate of this invention, dependent upon the size of the individual particles, the temperature, and the period of heating to which they were subjected. As the temperature of heating is raised beyond 900° C., such masses become progressively more coherent and eventually melt to a clear liquid when a sufficiently high temperature and period of heating are attained. Although the temperature of the heating may be raised to higher than 1300° C., in practice, and to facilitate subsequent pulverization or grinding, the heating need normally not be conducted to the point of complete fusion of the mass. The products obtained by sintering or melting are further disintegrated to produce particles of suitable sizes for use in the formulation of paints and other compositions such as are referred to herein.

In addition to their usefulness as pigments in the production of paints and coating compositions for paper, textiles, and the like, the products of this invention may be used in the production of ceramic glazes and as an opacifier and refractory in the production of ceramic bodies.

One of the preferred processes for producing the products and compound of this invention comprises essentially heating together commingled hydrous zirconium dioxide and precipitated barium metaborate. Precipitated barium metaborate may be conveniently prepared by reaction of solutions of barium sulfide or barium hydroxide with solutions of sodium tetraborate. Such a process is illustrated in Example 3 hereinafter.

Other preferred processes of the invention comprise heating zirconium dioxide or zirconium sulfate tetrahydrate together with barium sulfide or barium hydroxide, and boron trioxide, or boric acid. Such processes are illustrated in other examples hereinafter.

The starting compound that is referred to herein as zirconium sulfate tetrahydrate is the commercially available product that is prepared by treatment of precipitated basic zirconium sulfate with sulfuric acid followed by recrystallization of the product from sulfuric acid. Although this compound is commonly referred to by that name or as normal zirconium sulfate tetrahydrate, and is represented by the formula $Zr(SO_4)_2 \cdot 4H_2O$, whose molecular weight is 355.416, its properties indicate it to be representable more correctly as disulfatozirconylic acid having the formula $H_2ZrO(SO_4)_2 \cdot 3H_2O$. It readily loses three molecules of its water of crystallization on heating above 100° C., but temperatures of approximately 380° C. are required for releasing a final molecule of combined water. At temperatures above 380° C. the compound decomposes with the liberation of free sulfur trioxide ($SO_3$), but heating to temperatures in excess of 900° C. is required to produce zirconium dioxide ($ZrO_2$) free from traces of sulfur trioxide. Zirconium sulfate tetrahydrate is very soluble in water (approximately 146 grams in 100 milliliters at 37.5° C.) and its aqueous solutions have approximately the same pH values as sulfuric acid solutions of the same molar concentration.

The zirconium dioxide that was used in Example 1 and other examples that follow was prepared by gradually heating recrystallized zirconium sulfate tetrahydrate in a platinum crucible to ignition at a final temperature of approximately 1000° C. Hydrous gels of zirconium dioxide which are also suitable for the production of the barium zirconium borate of the present invention can be produced by neutralizing zirconium sulfate tetrahydrate with bases such as described in Example 3 hereinafter.

EXAMPLE 1

*Production of Barium Zirconium Borate From Barium Carbonate, Zirconium Dioxide, and Boric Acid*

(a) *Mixing and sintering.*—Stoichiometric quantities of reagent-grade barium carbonate ($BaCO_3$ 197.4 molecular weight), reagent-grade boric acid (2 moles $H_3BO_3$ 61.84 molecular weight) and zirconium dioxide ($ZrO_2$ 123.22 molecular weight) prepared as described hereinbefore were mixed together by grinding in a mortar and pestle. The mixture was then placed in a platinum crucible and heated in a closed muffle furnace maintained at a temperature of 1050° C. for one hour. The resulting sintered product was allowed to cool, removed from the crucible, reground in a mortar and pestle, again placed in the platinum crucible, and reheated without melting for an additional hour in the furnace at a temperature of 1050° C. The crucible and its contents were allowed to cool and the resulting product was again ground in a mortar and pestle. The resulting product was a white powder that appeared as crystals when examined with a polarizing microscope. The refractive index of the crystalline particles was approximately 1.77, determined microscopically with liquids of determinate refractive index.

(b) *X-ray powder diffraction analysis.*—The interplanar spacings observed on examination of the foregoing product by conventional X-ray powder diffraction analytical methods were as follows:

| Interplanar spacing ($d$ values), angstroms: | Relative intensity, $I/I_1 \times 100$ |
| --- | --- |
| 4.07 | 66 |
| 3.72 | 7 |
| 3.40 | 7 |
| 3.14 | 100 |
| 2.88 | 11 |
| 2.74 | 9 |
| 2.63 | 45 |
| 2.48 | 5 |
| 2.38 | 8 |
| 2.24 | 9 |
| 2.19 | 37 |
| 2.00 | 16 |
| 1.93 | 64 |
| 1.67 | 29 |
| 1.58 | 26 |
| 1.55 | 13 |
| 1.50 | 13 |
| 1.42 | 8 |
| 1.36 | 11 |
| 1.33 | 23 |
| 1.30 | 12 |
| 1.24 | 11 |
| 1.23 | 10 |
| 1.20 | 16 |
| 1.18 | 9 |
| 1.09 | 7 |
| 1.08 | 11 |
| 1.03 | 9 |
| 1.00 | 8 |
| 0.99 | 8 |
| 0.98 | 6 |
| 0.96 | 8 |
| 0.93 | 17 |

In the foregoing table, the interplanar spacings or distances between planes in the crystal are expressed in angstroms and represent the $d$ values obtained from the Bragg equation: $n\lambda = 2d \sin \theta$, in which $n$ is the order of diffraction (that is, 1 or other whole number), $\lambda$ is the wavelength of the X-rays in angstroms, and $\theta$ is the incident angle or one-half the angle of scattering of the rays. The relative intensity ($I/I_1$) is the quotient of the intensity of the particular diffraction line in arbitrary units (I) and the intensity of the strongest line in the same arbitrary units ($I_1$).

The foregoing X-ray diffraction results were obtained by direct measurements with a spectrogoniometer provided with a proportional counter tube, in which the angular scanning was made at a rate of 2 degrees per minute. The X-ray source was a copper target tube the radiation of which was filtered through a nickel disc to produce a radiation having an effective wavelength of 1.54 angstroms.

The foregoing X-ray diffraction data that were obtained for the product of this example differ from those of barium metaborate, barium zirconate, and zirconium dioxide. Since such data are characteristic of the crystal form and spacing, and thus are characteristic of chemical compounds rather than of elements or chemical groups, they conclusively prove that the product that formed is not a mere mixture of the individual starting materials but is a chemical compound. Its X-ray diffraction pattern is believed to be unique and different from that of any other compound whose diffraction data has heretofore been reported or determined.

EXAMPLE 2

*Production of Barium Zirconium Borate From Barium Carbonate, Zirconium Sulfate Tetrahydrate, and Boric Acid*

(a) *Mixing and sintering.*—In this example, recrystallized zirconium sulfate tetrahydrate (355.416 molecular weight) was used in place of the zirconium dioxide in Example 1.

Stoichiometric quantities of reagent grades of barium carbonate and boric acid were mixed together with recrystallized zirconium sulfate tetrahydrate by grinding with a mortar and pestle. The mixture was then placed in a platinum crucible and heated in a closed muffle furnace maintained at a temperature of 1100° C. for a period of one hour. The resulting sintered mass was allowed to cool, removed from the crucible, ground with a mortar and pestle, and returned to the platinum crucible and reheated for 30 minutes at a temperature of 1100° C. in the same oven. The resulting sintered mass, after cooling, was again ground in a mortar and pestle. The product was a white powder that had a pale brown tint, the particles of which were otherwise substantially identical with those of the barium zirconium borate of Example 1. They were crystalline under the polarizing microscope and had a refractive index of 1.77. Results of the analysis of this product (percent by weight) were as follows:

Found: BaO, 45.4; $ZrO_2$, 36.9; $B_2O_3$, 20.1. Stoichiometric: BaO, 44.30; $ZrO_2$, 35.59; $B_2O_3$, 20.11.

(b) *Extraction of products with water to determine their leachability.*—The amount of material which is leachable or extractable from the products by water was determined in the following manner: Five (5) grams of the product was placed into 100 milliliters of distilled water contained in a stoppered polyethylene bottle, and the suspension was shaken for 20 hours at prevailing room temperature. The clear solution or extract was then separated from the solid residue by filtration and the residue was added to a second quantity of 100 milliliters of water and the suspension again shaken for 20 hours and filtered. The extraction of the product was continued in this manner to observe the constancy of the composition of the successive extracts.

Each of the extracts thus obtained was then analyzed for its content of barium and boron. In the case of the products of this invention, the extracts were free from soluble zirconium compounds, indicating that barium zirconium borate hydrolyzes slowly in contact with water to liberate barium and borate ions. The extracts were assayed for barium and boron and the results are reported herein as barium oxide (BaO) and boron trioxide ($B_2O_3$) in grams per 100 milliliters of extract.

The results of extractions of the product of this example with water in the foregoing manner, which is typical of the results obtained with essentially pure barium zirconium borate prepared in accordance with processes described herein in other examples, were as follows:

| Extraction No. | BaO, Grams per 100 milliliters | B₂O₃, Grams per 100 milliliters |
| --- | --- | --- |
| 1 | 0.166 | 0.098 |
| 2 | 0.012 | 0.006 |
| 3 | 0.004 | 0.002 |
| 4 | 0.004 | 0.002 |
| 5 | 0.003 | 0.001 |
| 6 | 0.003 | 0.001 |
| 7 | 0.003 | 0.001 |
| 8 | 0.001 | 0.001 |
| 9 | 0.001 | 0.001 |

EXAMPLE 3

*Production of Barium Zirconium Borate and Intermediate Product From Barium Hydroxide, Boric Acid, and Hydrous Zirconium Dioxide*

(a) *Preparation of hydrous zirconium dioxide.*—Recrystallized zirconium sulfate tetrahydrate (100 grams) was added with stirring to 200 milliliters of distilled water and to the clear solution was added portionwise sodium hydroxide solution until no further precipitation occurred. The white, gelatinous precipitate of hydrous zirconium dioxide was separated by suction filtration in a Büchner funnel. The wet cake thus collected was washed several times with distilled water until the washings were free of all but faint traces of sulfate. Before use, a sample of this hydrous zirconium dioxide was ignited to determine its zirconium dioxide ($ZrO_2$) content.

(b) *Heating of aqueous mixture of barium hydroxide, boric acid, and hydrous zirconium dioxide.*—To an amount of hydrous zirconium dioxide prepared as described above equivalent to 24.6 grams (0.2 mole) of zirconium dioxide contained in a round-bottomed flask provided with a reflux condenser and stirrer was added with stirring 24.8 grams (0.4 mole) of boric acid and sufficient water to make a slurry that flowed freely. This slurry was then heated to a temperature sufficient to provide a gentle reflux, after which 63.1 grams of barium hydroxide octahydrate (0.2 mole) was added thereto with stirring. The mixture was heated at reflux temperature for an additional two hours, then cooled to 65° C., and the solids separated in a Büchner funnel. The wet cake was dried overnight in an oven maintained at 140° C. After pulverization with a mortar and pestle, the product was a very white, finely divided powder.

An infrared spectrum of the product indicated that this product, which is referred to herein as the intermediate product, was not a mere mixture of zirconium dioxide and barium borate. This was confirmed by the following further treatments to which samples of it were subjected.

(c) *Leaching of intermediate product.*—The intermediate product, when leached with water as described hereinbefore in Example 2(b), is not as leachable as barium metaborate nor as nonleachable as barium zirconium borate. Results of such leaching tests were as follows:

| Extraction No. | BaO, Grams per 100 milliliters | B₂O₃, Grams per 100 milliliters |
| --- | --- | --- |
| 1 | 0.322 | 0.153 |
| 2 | 0.314 | 0.151 |
| 3 | 0.265 | 0.130 |
| 4 | 0.183 | 0.093 |
| 5 | 0.108 | 0.057 |
| 6 | 0.079 | 0.043 |
| 7 | 0.055 | 0.032 |
| 8 | 0.046 | 0.026 |
| 9 | 0.036 | 0.021 |
| 10 | 0.028 | 0.017 |

(d) *Production of barium zirconium from intermediate product.*—A sample of the dried intermediate product prepared as described in part (b) hereinbefore was placed in a platinum crucible and heated in an oven at a temperature of 1050° C. for one hour. The resulting product was a sintered mass of individual granular particles whose surfaces were fused at various points to each other, yet were separated by voids, similar in texture to the porous cinder or ash that forms after the burning of a block of coal. The sintered product, after grinding with a mortar and pestle, consisted of white crystalline particles which had a refractive index of 1.77. The barium zirconium borate thus prepared, when leached with water as described in Example 2(b), produced, upon repeated leaching, extracts which were similar in composition to those produced by the product of Example 1. These leaching results were as follows:

| Extraction No. | BaO, Grams per 100 milliliters | B₂O₃, Grams per 100 milliliters |
| --- | --- | --- |
| 1 | 0.128 | 0.034 |
| 2 | 0.015 | 0.005 |
| 3 | 0.007 | 0.003 |
| 4 | 0.005 | 0.002 |
| 5 | 0.004 | 0.002 |
| 6 | 0.004 | 0.003 |
| 7 | 0.004 | 0.002 |
| 8 | 0.004 | 0.003 |
| 9 | 0.002 | 0.002 |
| 10 | 0.002 | 0.002 |

EXAMPLE 4

*Production of Mixture of Barium Zirconium Borate and Barium Metaborate*

(a) *Mixing and sintering.*—Reagent-grade barium carbonate, reagent-grade boric acid, and zirconium dioxide prepared as described hereinbefore were ground with a mortar and pestle in such proportions as to provide a mixture stoichiometrically equivalent to one mole of zirconium dioxide to two moles of each of barium oxide and boron trioxide.

The powdered mixture was transferred to a platinum crucible and heated therein for one hour in a closed muffle furnace maintained at a temperature of 1050° C. The contents of the crucible sintered but did not fuse to a clear melt. The sintered product, when pulverized after cooling, in a mortar and pestle, was a white free-flowing powder.

Its composition (percent by weight) that was found by analysis was as follows:

Found: BaO, 53.1; $B_2O_3$, 25.0; $ZrO_2$, 24.8. Stoichiometric for $BaO \cdot ZrO_2 \cdot B_2O_3 + BaO \cdot B_2O_3$: BaO, 53.8; $B_2O_3$, 25.0; $ZrO_2$, 24.8. The product was composed of particles having refractive indices of respectively 1.62 and 1.70, approximately.

(b) *Extraction of product with water to determine its leachability.*—The foregoing product was leached with water as described in Example 2(b). Results were as follows:

| Extraction No. | BaO, Grams per 100 milliliters | B₂O₃, Grams per 100 milliliters |
| --- | --- | --- |
| 1 | 0.403 | 0.185 |
| 2 | 0.104 | 0.070 |
| 3 | 0.104 | 0.071 |
| 4 | 0.099 | 0.069 |
| 5 | 0.103 | 0.071 |
| 6 | 0.008 | 0.006 |
| 7 | 0.003 | 0.001 |
| 8 | 0.002 | 0.001 |
| 9 | 0.002 | 0.001 |

All of the barium metaborate gradually leached from the product, as indicated by the foregoing results, to provide extracts containing initially high concentrations of barium and borate ions. After the seventh extraction, the product appeared to consist only of barium zirconium borate. The residue was dried and analyzed after the ninth extraction and its infrared spectrum was similar to that of barium zirconium borate. The results of the analysis (percent by weight) of this residue were as follows:

Found: BaO, 44.4; $ZrO_2$, 36.5; $B_2O_3$, 19.3. Stoichiometric for $BaO \cdot ZrO_2 \cdot B_2O_3$: BaO, 44.3; $ZrO_2$, 35.6; $B_2O_3$, 20.11.

EXAMPLE 5

*Production of Mixture of Barium Zirconium Borate and Zirconium Dioxide*

(a) *Mixing and sintering.*—Reagent grades of barium carbonate and boric acid, and zirconium dioxide prepared as described hereinbefore, were mixed together in such proportions as to provide a mixture equivalent stoichiometrically to two moles of zirconium dioxide to one mole of each of barium oxide and boron trioxide. The mixture was pulverized with a mortar and pestle, transferred to a platinum crucible, and heated for one hour in a closed muffle furnace maintained at 1000° C. The mixture, which did not fuse to a clear melt, was allowed to cool, removed from the crucible, ground in a mortar and pestle, and returned to the platinum crucible in which it was reheated for 14 hours in the furnace maintained at a temperature of 1000° C. The product was again allowed to cool and pulverized in a mortar and pestle. It was a white powder similar in appearance to that obtained in the preceding example. It had a refractive index of approximately 1.82.

(b) *Extraction of product with water to determine its leachability.*—The foregoing powdered product was leached with water as described in Example 2(b). The results were as follows:

| Extraction No. | BaO, Grams per 100 milliliters | $B_2O_3$, Grams per 100 milliliters |
| --- | --- | --- |
| 1 | 0.009 | 0.008 |
| 2 | 0.002 | 0.004 |
| 3 | 0.001 | 0.003 |
| 4 | 0.001 | 0.002 |
| 5 | 0.001 | 0.002 |

The foregoing leaching results are similar to those of barium zirconium borate, indicating that the product contains that compound. The excess zirconium dioxide that is contained in this product had no apparent effect on the leachability of barium and borate ions therefrom, nor upon the reactivity of the mixture to form barium zirconium borate.

Inasmuch as the foregoing specification comprises preferred embodiments of the invention, which were selected for purposes of illustration, it is to be understood that the invention is not restricted to such specific embodiments, and that modifications, variations, and alternatives, including such as are described or suggested hereinbefore in the section preceding the specific examples, or which are required to adapt the processes to the production of larger batches, may be made without departing from the invention, whose scope is limited solely by the appended claims.

What is claimed is:

1. A composition of matter consisting essentially of the product barium zirconium borate represented by the empirical formula $BaO \cdot ZrO_2 \cdot B_2O_3$.

2. Solid particles consisting essentially of a sintered mixture selected from the group consisting of (1) barium zirconium borate and barium metaborate wherein the barium metaborate content varies from 0 to 39.2 weight percent of said mixture and (2) barium zirconium borate and zirconium dioxide wherein the zirconium dioxide content varies from 0 to 26.2 weight percent of said mixture.

3. A process for the production of a homogeneous solid containing barium zirconium borate which comprises heating at a temperature between approximately 800° and approximately 1300° C. for a period between approximately 10 minutes and approximately 24 hours a commingled mixture selected from the group consisting of (1) 1 to 2 moles of zirconium dioxide and 2 to 1 moles of barium metaborate, (2) 1 to 2 moles of zirconium dioxide and barium and boron compounds that are convertible by such heating to 2 to 1 moles of barium metaborate, and (3) mixtures of barium metazirconate and boron compounds wherein said boron compounds are convertible by such heating to boron trioxide characterized in that the amounts of said barium metaborate and the resulting boron trioxide are present in about equal molar ratios.

4. A process for the production of a homogeneous solid containing barium zirconium borate which comprises heating at a temperature between approximately 800° and approximately 1300° C. for a period between approximately 10 minutes and approximately 24 hours, a commingled mixture of barium metaborate and zirconium dioxide in approximately equal molar ratios.

5. A process for the production of a homogeneous solid containing barium zirconium borate which comprises heating at a temperature between approximately 800° C. and approximately 1300° C. for a period between approximately 10 minutes and approximately 24 hours, a commingled mixture of barium metaborate and zirconium sulfate tetrahydrate in approximately equal molar ratios.

References Cited in the file of this patent

UNITED STATES PATENTS

| | | |
| --- | --- | --- |
| 2,875,085 | Morris et al. | Feb. 24, 1959 |
| 3,011,901 | Traub et al. | Dec. 5, 1961 |

UNITED STATES PATENT OFFICE
CERTIFICATE OF CORRECTION

Patent No. 3,085,893                                        April 16, 1963

Stanley J. Buckman et al.

It is hereby certified that error appears in the above numbered patent requiring correction and that the said Letters Patent should read as corrected below.

Column 4, line 4, for "homogenous" read -- homogeneous --; column 8, line 1, after "zirconium", in italics, insert -- borate --, in italics; column 10, line 33, for "metaborate" read -- metazirconate --.

Signed and sealed this 22nd day of October 1963.

(SEAL)
Attest:

ERNEST W. SWIDER
Attesting Officer

EDWIN L. REYNOLDS

Acting Commissioner of Patents